G. MAIRE.
TRAP FOR CATCHING AND DESTROYING INSECTS.
APPLICATION FILED SEPT. 28, 1910.
1,012,566.
Patented Dec. 19, 1911.
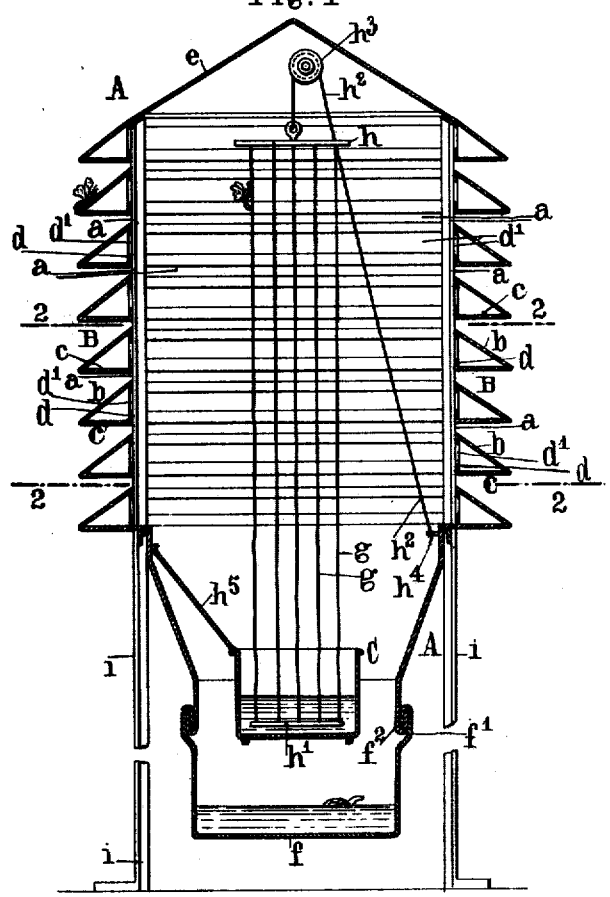
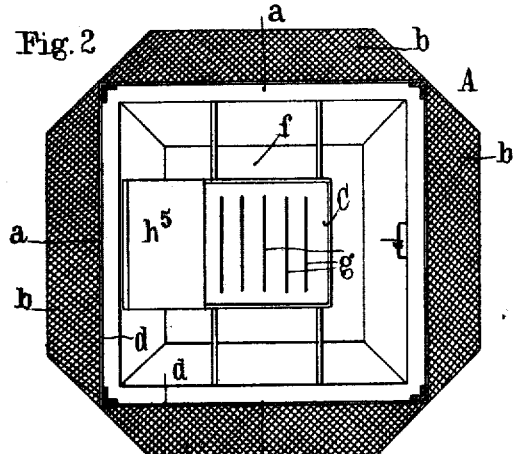
INVENTOR
Georges Maire
BY
ATTORNEYS

UNITED STATES PATENT OFFICE.

GEORGES MAIRE, OF ALEXANDRIA, EGYPT.

TRAP FOR CATCHING AND DESTROYING INSECTS.

1,012,566.  Specification of Letters Patent.  Patented Dec. 19, 1911.

Application filed September 28, 1910. Serial No. 584,329.

*To all whom it may concern:*

Be it known that I, GEORGES MAIRE, a citizen of the Republic of France, and a resident of 108 Rue du Prince Abdel-Moncim, Alexandria, Egypt, have invented a new and useful Trap for Catching and Destroying Insects, of which the following is a specification.

The invention has for its object an apparatus intended for catching and destroying certain insects which are harmful to agriculture and butterflies in particular. It is characterized by a cage provided with inlets presenting the form of cavities enabling the insect to enter the trap but preventing it from leaving it.

The apparatus also comprises an attractive device constituted by pieces of fabric impregnated with an odoriferous liquid exerting great attractive power for the insects or else a light or some other device serving the same purpose.

It also comprises a part in which the insect is destroyed.

This trap may be constructed in the form of a kiosk, lantern or the like according to the purpose it is intended to serve.

The invention is hereinafter described by way of example with reference to the accompanying drawing in which:—

Figure 1 is a vertical section of a trap presenting the form of a kiosk. Fig. 2 is a horizontal section on the line 2 2 in Fig. 1.

The trap constructed as a kiosk (Figs. 1 and 2) is employed more particularly for catching butterflies of the kind which ravage cotton plantations. It consists of a cage A of variable proportions and rectilinear in form in the example illustrated; its form may, however, be circular or prismatic. The walls of this cage present horizontal openings or slots $a$, the height of which varies according to the size of the insects to be captured. These openings $a$ are adjacent cavities B each having an inclined wall $b$ ending at the inlet $a$ and forming a landing, and a horizontal wall $c$; the wall $d$ of the cage itself also having openings as at $d'$. The cavities might be arranged inversely, the horizontal part $c$ serving as the landing but generally speaking, this arrangement presents fewer advantages than that previously described. The cavities are preferably constituted of metallic gratings and pieces of sheet metal fixed to the framework of the cage; they might equally well be formed of perforated sheet metal, wood or other suitable material, but metal gratings of some kind are the most practical as they insure the circulation of the air.

The kiosk is closed at its upper part by an inclined roof $e$ affording protection against rainwater. Its lower part comprises a box or drawer $f$, the flanges $f'$ of which are adapted to slide in slideways $f^2$ rigid with the walls of the cage A. This drawer may contain water mixed with phenol, phenic acid or some other ingredient serving for the destruction of the insects contained in the cage, or it may be filled with plants of which the insects are fond and upon which they can live and lay eggs if it be desired to study them closely. The drawer $f$ might likewise be replaced by a bag with a running cord that it would only be necessary to immerse in the water in order to drown the insects. The attracting means is constituted of a box or basin C containing an odorous liquid in which the strips of fabric $g$ are immersed; these strips consist of sack-cloth, wick or other substances adapted to become readily impregnated with liquid and to permit of the circulation of the air so that the air may become charged with odoriferous effluvia. The ends of the strips $g$ are attached to the frames $h$ $h'$, the first of which is fixed to the bottom of the box C and the second to the end of a cord or small chain $h^2$ passing over a pulley $h^3$ mounted at the upper part of the apparatus and secured at $h^4$. In the operative position the strips $h$ are stretched by means of the cord $h^4$, while in the inoperative position and during the impregnation with liquid these strips are lodged in the box C, the lid $h^5$ of which is closed so as to prevent any useless evaporation. This special arrangement of the box C and of the strips of fabric $h$ are very efficient as regards the impregnation with odors and their diffusion. The inverse arrangement might, however, be adopted, that is to say the box C might be arranged at the upper part of the apparatus in which case the liquid would flow by gravity or siphon action instead of rising by capillarity or again the pieces of fabric might be arranged horizontally.

The apparatus may be mounted on legs $i$ extending a certain height above the ground.

The trap acts in the following manner:

When attracting means has been placed in position the odors which are preferably selected in accordance with the nature of the culture to be protected are diffused by the wind and compete with the sweet substances of the flower; consequently if the apparatus is placed in the middle of a field the insects within the zone traversed by the effluvia will rapidly seek its source and alight upon the landings $b$ upon which they will move with a general tendency to rise which conducts them toward the admission apertures $a$. Thence the insect flies toward the strips $h$ and becomes gorged with the liquid; it will resume its flight at hazard hardly ever encountering the entrance windows and escaping therefrom. The insect which has not fallen directly into the destroying device constituted by the box $f$ will almost always rest either upon the inner face of the wall $c$ of the cavities and thereby be imprisoned, or upon the vertical wall $d$ and endeavor to rise; in this case it encounters the opening $a$, finds a void in front and seeks a fresh supporting surface which is found beyond one of the openings $a$ and continues its ascent in the cage without ever being able to execute the quarter circle movement which would enable it to pass through these openings, and falls generally into the box $f$.

The apparatus described above is particularly adapted for the protection of cultivated fields from the ravages of butterflies. When it is desired to protect trees or shrubs a cage of smaller dimensions is employed.

The invention is not confined to the constructional forms described above by way of example only; the attracting means may be constituted by any suitable device such as a light or the like.

What I claim and desire to secure by Letters Patent of the United States is:—

1. A trap for catching insects, consisting of a cage having a plurality of slots, plates upon the exterior of the cage and extending horizontally from the upper edges of said slots, and plates also exterior of the cage and inclined outwardly and downwardly, the said horizontal and inclined plates on opposite edges of adjacent slots having their outer edges in contacting relation between the slots.

2. A trap for catching insects, comprising a cage having a vertical wall provided with slots, perforated inclined plates extending from the lower edges of said slots, horizontal plates extending from the upper edges of said slots and in respective contact with said inclined plates, said horizontal and inclined plates forming, with portions of said vertical wall, cavities for the reception of the insects.

3. A trap for catching insects, comprising a cage, the walls of which have entrance openings for the insects, a normally open receptacle supported within the cage and containing an odoriferous liquid, upper and lower frames within said cage and above said receptacle, fluid absorbing strips connecting said frames, means to movably support the upper frame whereby both frames and said strips may be lowered into the receptacle, and a cover for closing said receptacle.

In testimony whereof I have signed my name to this specification, in the presence of two subscribing witnesses.

GEORGES MAIRE.

Witnesses:
GEORGE G. FAGET,
HENRI DEBARRE.

---

Copies of this patent may be obtained for five cents each, by addressing the "Commissioner of Patents, Washington, D. C."